United States Patent [19]

Sankrithi et al.

[11] Patent Number: 4,956,780
[45] Date of Patent: Sep. 11, 1990

[54] FLIGHT PATH ANGLE COMMAND FLIGHT CONTROL SYSTEM FOR LANDING FLARE

[75] Inventors: Mithra M. K. V. Sankrithi, Bellevue; Scott L. Pelton, Renton, both of Wash.

[73] Assignee: The Boeing Company, Seattle, Wash.

[21] Appl. No.: 386,874

[22] Filed: Jul. 27, 1989

Related U.S. Application Data

[63] Continuation-in-part of Ser. No. 282,265, Dec. 8, 1988, abandoned.

[51] Int. Cl.[5] .............................................. G06F 15/50
[52] U.S. Cl. .................................... 364/428; 244/181; 244/183; 244/186; 364/433
[58] Field of Search ............... 364/428, 427, 433, 434, 364/430; 244/180, 181, 183, 185–187; 318/584

[56] References Cited

U.S. PATENT DOCUMENTS

| | | | |
|---|---|---|---|
| 2,830,291 | 4/1958 | Hecht et al. | 342/411 |
| 3,126,474 | 3/1964 | Zweibel et al. | 364/559 |
| 3,280,310 | 10/1966 | Montooth | 364/166 |
| 3,333,795 | 8/1967 | Hattendorf et al. | 244/187 |
| 3,578,269 | 5/1971 | Kramer et al. | 364/428 |
| 3,604,908 | 9/1971 | Loome et al. | 364/430 |
| 3,626,163 | 12/1971 | Dommasch | 364/429 |
| 3,652,835 | 3/1972 | Devlin et al. | 244/187 |
| 3,743,221 | 7/1973 | Lykken et al. | 244/180 |
| 3,801,049 | 4/1974 | Simpson et al. | 244/187 |
| 3,916,688 | 11/1975 | Dendy et al. | 73/178 T |
| 4,037,086 | 7/1977 | Foster et al. | 364/433 |
| 4,413,320 | 11/1983 | Brandau et al. | 364/428 |
| 4,589,616 | 5/1986 | Zweifel | 244/180 |
| 4,633,404 | 12/1986 | Greeson et al. | 364/433 |
| 4,638,229 | 1/1987 | Birkedahl | 318/584 |

FOREIGN PATENT DOCUMENTS

1178673  1/1970  United Kingdom ............... 244/187

OTHER PUBLICATIONS

Menn, "Digital Letdown Computer for Vertical Guidance," *IEEE Transactions on Computers* (vol. C-18, No. 11), Nov. 1969, p. 1065.
Sankrithi et al., "7J7 Manual Flight Control Functions," AIAA Guidance and Control Conference, Monterey, Calif. Aug. 17–19, 1987.
"A320 Under Test," *Flight International*, Jun. 13, 1987, pp. 111–113.
Nordwall, "Boeing Evaluating New Control Laws in 7J7 Advanced-Technology Simulator," *Aviation Week & Space Technology*, Jun. 29, 1987, pp. 54–56, 59.
"Flight-Test Airbus A320," *Flight International*, Dec. 12, 1987, pp. 23–27.

*Primary Examiner*—Thomas G. Black
*Attorney, Agent, or Firm*—Christensen, O'Connor, Johnson & Kindness

[57] ABSTRACT

This invention provides a flare control modification for pilot-in-the-loop aircraft maneuver command electronic flight control systems. During flare pilot pitch control inputs are interpreted as incremental flight path angle commands above a reference flight path angle (nominally a −3° glideslope). The flare control modification allows conventional piloting technique (i.e., pitch controller pull-and-hold) to be used during flare, while retaining the benefits of the maneuver command system masking effects of gusts, winds, windshear, and variations in airplane weight, balance, and aerodynamic configuration.

30 Claims, 11 Drawing Sheets

FLIGHT PATH ANGLE COMMAND FLIGHT CONTROL SYSTEM FOR LANDING FLARE

CROSS-REFERENCE TO RELATED APPLICATION

This application is a continuation-in-part of U.S. application Ser. No. 07/282,265 now abandoned filed Dec. 8, 1988, and entitled "Flight Path Angle Command Flight Control System For Landing Flare."

TECHNICAL AREA

This invention relates to aircraft maneuver command flight control systems and, more particularly, the landing flare mode of operation of aircraft maneuver command flight control systems.

BACKGROUND OF THE INVENTION

Until very recently, the primary flight control systems of commercial aircraft have utilized mechanical cables to transmit pilot produced control inputs to the control surfaces of the aircraft. Pilot-produced inputs are created by a pilot moving various pitch, roll and yaw axis control devices, such as the column, wheel and rudder pedals located in front of the pilot (and co-pilot) seat(s) in an aircraft cockpit. The control surfaces of the aircraft include the elevators, ailerons, spoilers and rudder of the aircraft. In operation, a pilot manually "flies" an aircraft by moving various pitch, roll and yaw axis control devices so as to position the control surfaces in a way that makes the aircraft follow a desired flight path through space. Aircraft weight, center of gravity location, aerodynamic configuration and location in a flight envelope determine how the pilot positions the pitch, roll and yaw axis control devices in order to follow a desired flight path. Changes in any of these factors require that the position of the control devices be different, even when performing the same maneuver. Especially in adverse weather conditions (e.g., turbulence, wind shear, precipitation and poor visibility), pilot workload from manually operating pitch, roll and yaw axis control devices, plus navigation and other equipment, can become excessively high. Excessive pilot workload has the possibility of compromising safety, particularly during critical portions of a flight, such as approach, flare and landing.

Over the years, flight control system improvements, such as hydraulically powered control surfaces, "feel" systems, ratio changers and yaw dampers, have helped to reduce pilot workload and to provide a more uniform airplane response to given pilot control inputs when an aircraft is operating with different center of gravity locations and in different parts of its flight envelope. While these improvements have helped to reduce pilot workload under normal operating conditions, they have only partially solved the pilot workload problem in adverse weather conditions. The pilot workload problem in adverse weather conditions has been only partially solved because, even with these improvements, the basic way a pilot flies an airplane has remained unchanged--the pilot still commands control surface positions by positioning pitch, roll and yaw axis control devices.

The generation of commercial transport aircraft presently being developed will feature electronic flight control systems that are expected to provide a quantum reduction in pilot workload and a quantum improvement in flying qualities. Electronic flight control systems, such as fly-by-wire (FBW) and fly-by-light (FBL) flight control systems, will permit a pilot to command parameters other than control surface position with available control devices. For example, one system presently being considered for use on the next generation of Boeing aircraft allows a pilot to command flight path angle rate-of-change through a pitch-axis control device. The pitch-axis control device is presently contemplated to be in the form of either a conventional control wheel column or a sidestick controller. Based on the pilot's positioning of the control device, the electronic flight control system will command the elevators of the aircraft to move in the manner required for the aircraft's actual flight path angle rate-of-change to follow the pilot's commanded flight path angle rate-of-change. In other words, a given input on the pitch axis control device will command a given rate-of-change of the flight path angle of the aircraft. Returning the control device to a neutral position will zero the rate-of-change, not the flight path angle. As a result, when the control device is placed in a neutral position, the aircraft will maintain the previously set flight path angle. Changing from a climb angle (or a descent angle) to level flight will require that a pilot move the control device to cause the flight path angle to decrease (or increase) until the aircraft's flight path is level. That is, movement of the pitch axis control device will cause a flight path angle change to occur that will ultimately result in the aircraft reaching level flight, at which time the control device will be moved to its neutral position. The magnitude of pitch axis control device movement will control the magnitude of the rate-of-change of flight path angle.

The foregoing system reduces pilot workload because the electronic flight control system forces the aircraft to follow the pilot's flight path angle rate-of-change commands regardless of aircraft inertia or aerodynamic configuration, location in the flight envelope, or the presence of external disturbances such as turbulence and wind shear. While a flight path angle rate-of-change electronic flight control system is expected to considerably improve pitch-axis flying qualities during the takeoff, climb, cruise and descent portions of a flight, the use of flight path angle rate-of-change commands during the flare portion of a landing poses problems in two specific areas. First, in a conventional flare maneuver, a pilot pulls back a control column or stick and holds it back until the wheels of the aircraft touch the runway, i.e., the aircraft lands. This action causes a flight path angle change that is dependent on how far the stick is pulled back and held. In a flight path angle rate-of-change electronic flight control system, a flight path angle change is caused by applying a control pulse, not a steady pull and hold, to a pitch axis control device. This procedural difference requires pilot retraining and the additional expense associated with such retraining in order for a flight path angle rate-of-change electronic flight control system of the type described above to be used during the flare portion of a landing. The second problem area relates to the risk of overflaring. The risk of overflaring is increased substantially using a flight path angle rate-of-change electronic flight control system if a pilot does not return the pitch axis control device to its detent (i.e, neutral) position at the precise time the flight path angle of the aircraft achieves the small negative number, approximately $-0.5°$, that produces a low-sink-rate landing. If the flight path angle goes positive, a pilot using a flight path angle rate-of-change electronic flight control system is required to push the pitch axis control device to a position that creates the negative flight path angle rate required to restore the negative flight path angle needed to continue the landing. In summary, unconventional pilot maneuvering techniques during the flare portion of a landing are required with a flight path angle rate-of-change electronic flight control system of the type described above.

One obvious way to avoid the foregoing problem is to deactivate the flight path angle rate-of-change electronic flight control system during the flare portion of a landing. This approach has the disadvantage of losing all of the turbulence rejection, configuration masking and flight-envelope location masking effects normally provided by an electronic flight control system. Because flare is a high pilot workload portion of a flight, the loss of handling qualities and turbulence rejection benefits during landing flare is highly undesirable.

The present invention is directed to avoiding the foregoing and other problems by providing a flare control modification for the pitch axis part of a maneuver command electronic flight control system that maintains the advantages of the system while allowing the pilot to use conventional piloting techniques during the flare portion of a landing. More specifically, the present invention is directed to providing a flight path angle command flight control system for landing flare that reduces the risk of overflaring during the flare portion of a landing maneuver while retaining the turbulence rejection, configuration masking and location in the flight envelope masking benefits provided by closed loop electronic flight control systems.

SUMMARY OF THE INVENTION

In accordance with this invention, a flare control modification for a maneuver command electronic flight control system is provided. The flare control modification comprises providing a flight path angle command control mode of operation during landing flare. When the landing flare flight path angle command mode of operation is working, the force applied by a pilot to an aircraft's pitch axis control device commands an incremental flight path angle above a reference flight path angle ($-3°$ for most glide slopes). During flight regimes other than landing flare (i.e., climb, cruise and descent), commonly referred to as up-and-away flight, normal operation of the maneuver command electronic flight control system occurs, wherein, typically, the force applied by the pilot to the pitch axis control device commands flight path angle rate-of-change.

A major benefit of the flare control modification is that it permits conventional piloting techniques to be used during the flare portion of a landing without loss of the benefits of a maneuver command electronic flight control system, namely turbulence rejection, configuration effect masking and location in the flight envelope effect masking.

BRIEF DESCRIPTION OF THE DRAWINGS

The foregoing and other features and advantages of this invention will become more readily appreciated as the same becomes better understood by reference to the following detailed description of preferred embodiments of the invention when taken in conjunction with the accompanying drawings wherein.

DESCRIPTION OF THE PREFERRED EMBODIMENTS

Figure 1:
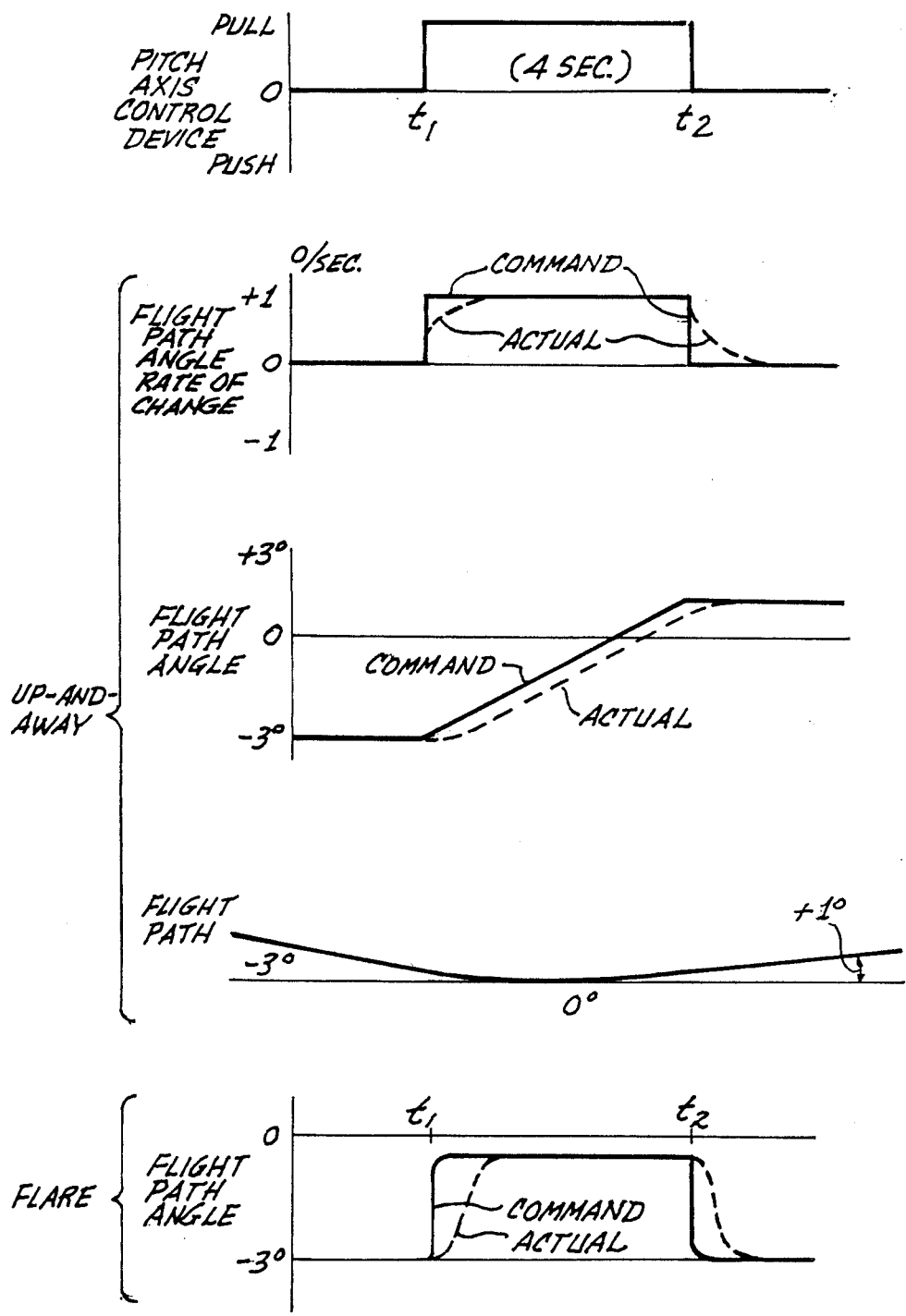
FIG. 1 is a series of time history lines used to describe the operation of a maneuver command electronic flight control system.

Prior to describing the preferred embodiments of the invention illustrated in the drawings, a brief description of the operation of the pitch axis part of a typical up-and-away maneuver command electronic flight control system is set forth. In this regard, as shown on the first time history line of FIG. 1, when the pilot of an aircraft using such a flight control system desires to change the aircraft's flight path angle, he moves a pitch axis control device in one direction or the other. If the control device is a conventional wheel and stick, the stick is pulled toward the pilot, or pushed away from the pilot. If the control device is a sidestick controller, the sidestick controller is moved in one direction or the other to create the same effect, i.e., a "pull" or a "push". FIG. 1 illustrates what occurs when the control device is "pulled" toward the pilot by a fixed amount for a period of time lying between $t_1$ and $t_2$. For purposes of discussion only, the illustrated time period is denoted as four (4) seconds (i.e., $t_2-t_1=4$ seconds). The end result is a four-second pulse input. For purposes of discussion, as shown in time history line 2 of FIG. 1, it is assumed that the flight path angle rate-of-change caused by the pull is a $+1°$ per second rate-of-change. While the commanded flight path angle rate-of-change is a rectangular pulse, as shown by solid lines in time history line 2, the actual flight path angle rate-of-change, as shown by dashed lines, lags behind the commanded flight path angle rate-of-change. The third time history line of FIG. 1 illustrates the flight path angle command created by a maneuver command electronic flight control system in response to a flight path angle rate-of-change command of the type illustrated in time history line 2, based on the assumption that the aircraft is descending along a −3° flight path angle when the control device is pulled by the pilot. Since the commanded flight path rate-of-change is +1° per second, as shown in the second time history line of FIG. 1, the aircraft's flight path angle command changes from −3° to +1° during the period of time that the control device is pulled back, i.e., between $t_1$ and $t_2$. If the control device had been returned to its neutral, i.e., zero, position after three seconds, rather than after four seconds, the aircraft would have achieved level flight rather than a 1° climb flight path. As will be better understood from the following description, the fifth time history line shows a typical flight path angle response when a maneuver command electronic flight control system modified in accordance with this invention is controlling an aircraft during flare for the same pilot input shown on the first time history line.

Figure 2:
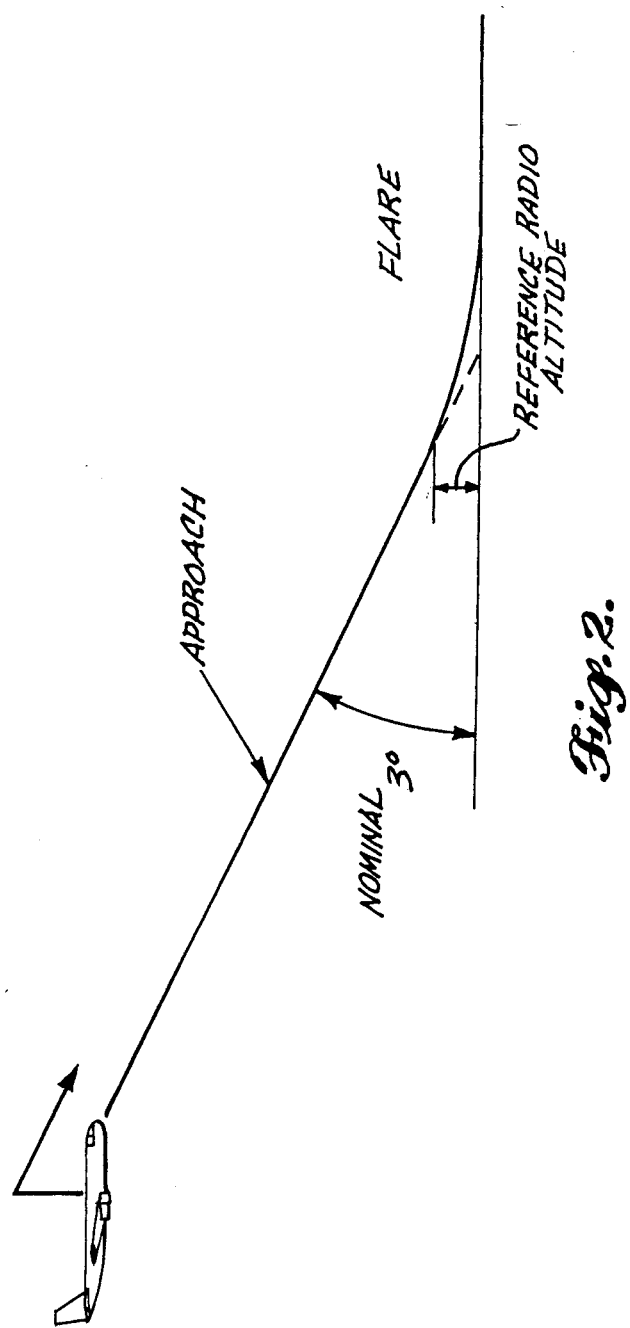
FIG. 2 is a pictorial diagram illustrating the flight path followed by an aircraft as it lands, in which the approach angle has been significantly exaggerated for clarity and ease of understanding.

As shown in FIG. 2, during landing, an aircraft approaches the runway along a descent angle having a predetermined nominal value. While the actual value depends upon the airport runway being approached, a suitable nominal value is −3°, which is shown exaggerated in FIG. 2 for purposes of illustration. Just prior to touchdown, at approximately fifty feet (50') above the runway, the nose of the aircraft is raised and the plane enters the flare or final portion of the landing phase. If the flare is performed in an ideal manner, little, if any, bumping or bouncing occurs as the wheels of the aircraft touch the runway. In essence, the flare portion of the landing creates a low-sink-rate touchdown by rotating the aircraft's flight path to a shallow angle (e.g., −0.5°).

One of the major disadvantages of an electronic flight control system operating in the manner depicted in the first four time history lines of FIG. 1 and described above is that it requires unconventional pilot inputs during the flare portion of a landing. More specifically, in a conventional aircraft, the pilot simply pulls back the pitch-axis control device, i.e., the stick, of the aircraft. The degree of pull determines the degree of rotation of the aircraft about its pitch axis and, thus, the degree of flare. Unfortunately, a flight path rate maneuver command electronic flight control system that produces time histories of the type illustrated in the first four lines of FIG. 1 as well as other types of maneuver command systems (e.g., a C* maneuver command system) require a pulse command from the pilot in order to flare the aircraft being controlled, rather than a pull-and-hold command. If the pilot does not return the pitch axis control device to its detent position at the precise time the flight path angle command achieves a small negative number (e.g., −0.5°), the flight path angle of the aircraft will turn positive, requiring the pilot to push the pitch axis control device in order to continue the landing. Obviously, retraining pilots to control the flare part of a landing in what is presently an unconventional manner is undesirable from both expense and safety points of view. The present invention is directed to avoiding this problem by providing an incremental flight path angle control system that becomes operational during flare. The incremental flight path angle control system produces a nonintegral path response to a control input of the type illustrated in the last time history line of FIG. 1. FIGS. 3–6A illustrate in functional block form alternative ways of modifying the pitch axis part of a maneuver command electronic flight control system in the manner contemplated by this invention that achieves the desired nonintegral flight path angle response during flare.

Figure 3:
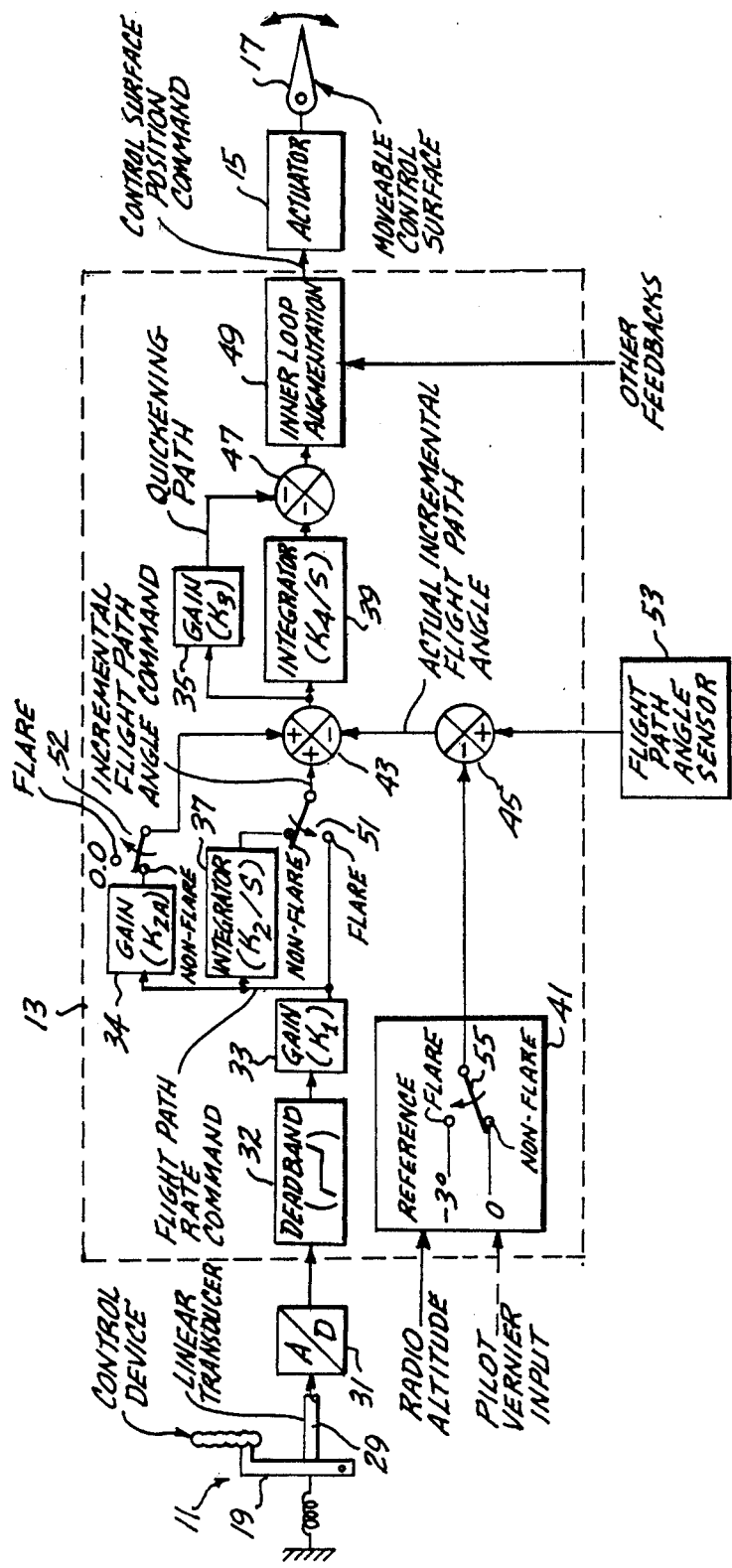
FIG. 3 is a functional block diagram of a flare control modification for a maneuver command electronic flight control system formed in accordance with this invention.
Figure 3A:
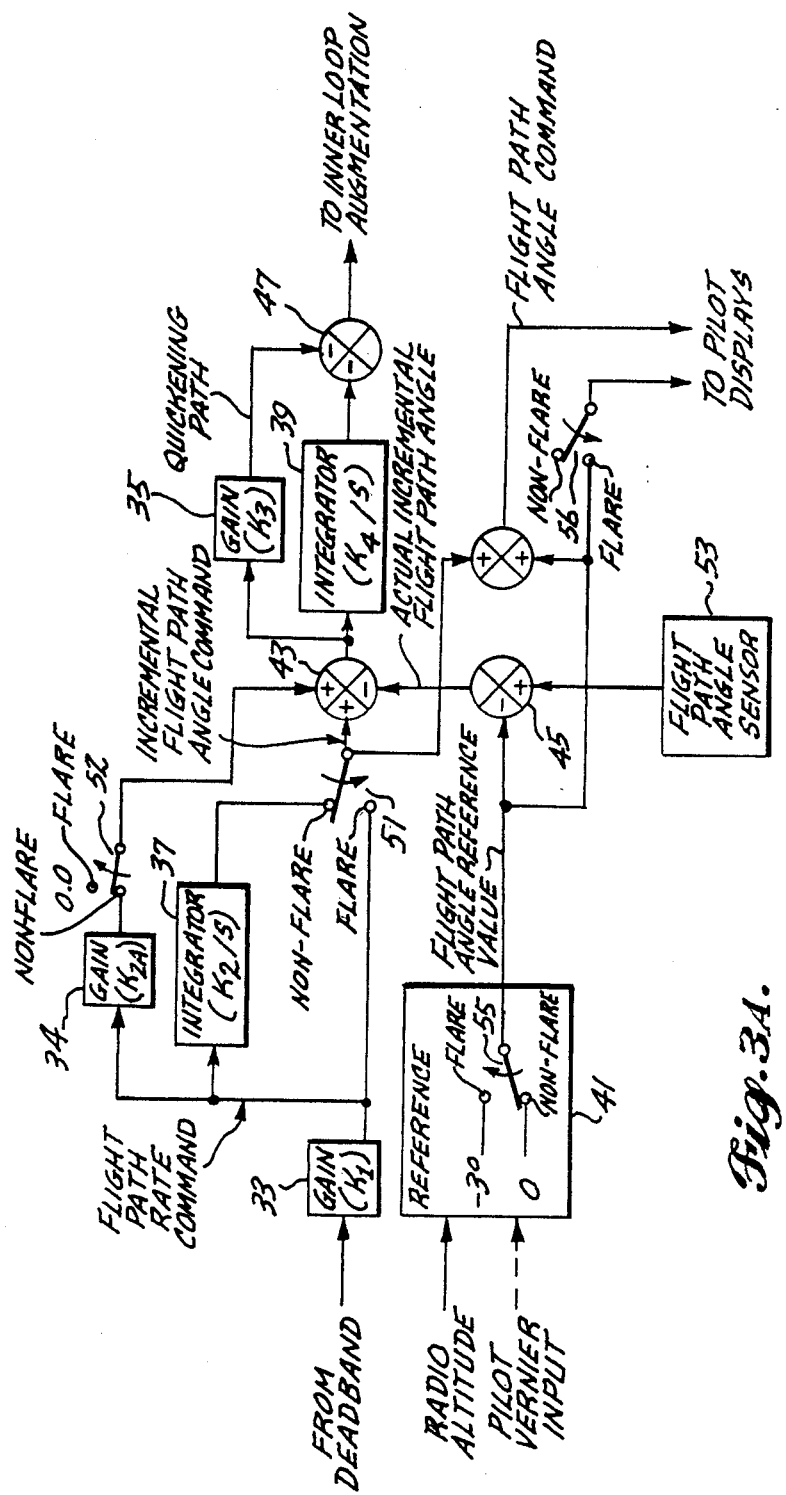
FIG. 3A is a functional block diagram of an alteration of the flare control modification illustrated in FIG. 3.

As will be better understood from the following description, the present invention modifies, during flare, an electronic flight control system that, for up-and-away flight, produces flight path angle commands by integrating control signals that are representative of the deflection of a pilot-operated pitch axis control device. The flare modification comprises eliminating the effect of the integration of the control signals that are representative of the deflection of a pilot-operated control device and producing an incremental flight path angle command, relative to a reference, directly from control signals that are representative of the deflection of the pilot-operated control device during the flare portion of a landing. Thus, rather than producing a flight path angle command as a result of integrating a signal that is representative of the deflection of a pilot-operated control device, the invention produces an incremental flight path angle command that is proportional to the signal that is representative of the deflection of the pilot-operated control device. The effect of the integration is eliminated during flare by either bypassing the integration function or differentiating the signal that is representative of the deflection of the pilot-operated control device prior to the signal being integrated. Mathematically, the effect of the differentiation, of course, counters the effect of the integration. FIGS. 3 and 3A illustrate embodiments of the invention wherein the effect of the integrator is eliminated by simply eliminating the integrator function during flare and FIGS. 4–6A illustrate embodiments of the invention wherein the effect of the integrator is eliminated by differentiating the signal that is representative of the deflection of the pilot-operated control device prior to the signal being integrated.

FIG. 3 includes: a pilot-operated pitch control device 11; the pitch axis part of an electronic flight control system 13; an actuator 15; and, a movable control surface, i.e., an elevator 17. The pilot-operated pitch control device 11 is pictorially illustrated as comprising a column and wheel controller. Centerstick, sidestick, force sensitive stick, and other types of control devices can also be used by the invention. In the illustrated embodiment, a linear transducer 29 attached to the column 19 of the column and wheel controller is oriented such that the position of the column 19 controls the magnitude of an analog signal produced (or controlled) by the transducer 29. Obviously, other types of transducers can be used. For example, force transducers may be used. Further, angular (rotary) transducers may be used rather than linear (displacement) transducers. Further, the analog signals produced by the chosen transducer can be in electric, optic, fluidic or other form.

The analog signal produced (or controlled) by the transducer 29 is applied to the input of an analog-to-digital converter 31. The digital output of the analog-to-digital converter 31 is applied to the electronic flight control system 13 in the manner described below. As will be readily understood by those familiar with transducers, the analog signal producing transducer and the analog-to-digital converter can be replaced with a digital transducer.

While, for ease of description, the pitch axis part of the electronic flight control system 13 illustrated in FIG. 3 is shown in control law block form, and the blocks described as circuits, it is to be understood that the control law blocks can be implemented in integrated circuit form, discrete element circuit form, analog circuit form, or software form. Preferably, the functions of the control law blocks are implemented in a computer control program whose overall purpose is to control the aerodynamic operation of an aircraft based on pilot or autopilot inputs in combination with a variety of sensor inputs. That is, preferably the functions of the illustrated control law blocks form part of the primary flight control/flight management computer complex of an aircraft embodying this invention. The illustrated functional control law blocks include: a deadband circuit 32; first, second and third gain circuits 33, 34 and 35; first and second integrators 37 and 39; a reference circuit 41; a three-input summer 43; first and second two-input summers 45 and 47; an inner loop augmentation circuit 49; and, a first and second two-position switch 51 and 52. Also illustrated in FIG. 3 is a flight path angle sensor 53.

The digital signal produced by the analog-to-digital converter 31 is applied to the dead band circuit. In a conventional manner, the dead band circuit ignores or rejects small signals. Signals that pass through the dead band circuit 32 are amplified by the first gain circuit 33 by a predetermined value denoted $K_1$. The output of the first gain circuit 33 is applied to the input of the first integrator 37, the input of the second gain circuit 34 and to one of the remote terminals of the first two-position switch 51, denoted the flare terminal. The first integrator may also have a gain value, designated $K_2$, in which case the Laplace transfer function of the first integrator has the form $K_2/s$. The output of the first integrator 37 is applied to the second remote terminal of the two-position switch 51, denoted the non-flare terminal. The common terminal of the first two-position switch 51 defines an incremental flight path angle command when the switch is in the flare position, which is applied to a positive input of the three-input summer 43.

The output of the second gain circuit, which has a gain value denoted $K_{2A}$, is applied to one of the remote terminals of the second two-position switch 52, denoted the non-flare terminal. The other remote terminal, denoted the flare terminal, is unconnected. The common terminal of the second two-position switch 52 is applied to a positive input of the three-input summer 43.

The reference circuit 41 produces a flight path angle reference value when the aircraft descends to a predetermined altitude. Prior thereto, the output of the reference circuit 41 is zero. The flight path angle reference value may be fixed or changed by a suitable pilot vernier input which may take the form of a ramp up/down command from a thumbswitch located on the column of the pitch control device 11. In any event, above flare altitude, the radio altimeter value controls the reference circuit 41 such that the output of the reference circuit, i.e., the flight path angle reference value, is zero. When the aircraft drops to the altitude where a flare is to begin, the reference circuit produces a flight path angle reference value whose magnitude represents the nominal or desired approach angle, i.e., $-3°$. Alternately, the flight path angle reference could be initialized to the last flight path angle command at flare entry.

The output of the reference circuit, i.e., the flight path angle reference, is applied to a negative input of the first two-input summer 45. The output of the flight path angle sensor 53 (or other flight path angle source) is applied to a positive input of the first two-input summer 45. Other flight path angle sources include inertial and air mass sensors, and complementary filter blends of inertial and air mass sensor generated data.

The output of the first two-input summer 45 is applied to a negative input of the three-input summer 43. The output of the three-input summer 43 is applied to the input of the third gain circuit 35 and to the input of the second integrator 39. The third gain circuit 35 provides a gain value, designated $K_3$. The second integrator may produce a gain value, designated $K_4$, in which case the Laplace transform of the second integrator has the form $K_4/s$. The outputs of the third gain circuit 35 and the second integrator 39 are each applied to a negative input of the second two-input summer 47. The output of the second two-input summer 47 is applied to the input of the inner loop augmentation circuit 49. Feedbacks from other systems are applied to another input(s) of the inner loop augmentation circuit 49. The output of the inner loop augmentation circuit, which is a control surface position command signal, is applied to the input of the actuator 15. In response to this signal, the actuator controls the position of the elevator 17, which, typically, is hydraulically or electrically powered. Alternatively, a variable incidence stabilizer, canard control surface flap or spoiler can be used instead of, or in addition to, the elevator. The other feedbacks applied to the inner loop augmentation circuit 49 may come from a variety of sources. Included are items such as the pitch attitude of the aircraft, the pitch rate of the aircraft, the normal load factor and other factors that affect the orientation of the aircraft about its pitch axis. Examples of other factors include air data feedbacks and configuration parameters (e.g., flap and gear configuration) used for gain scheduling, and roll attitude for steady pitch axis turn compensation.

During the non-flare parts of a flight, the signal produced by the control device 11 is in the form of a flight path rate-of-change command (for shorthand purposes sometimes denoted a flight path rate command) that is integrated by the first integrator 37 to produce a flight path angle command. Since the output of the reference input circuit is zero during approach, the flight path angle command produced by the first integrator 37 and the output of the second gain circuit 34 are subtractively summed in the three-input summer 43 with the flight path angle signal produced by the flight path angle sensor 53. The resultant error signal, i.e., the difference between the commanded flight path angle and the sensed or existing flight path angle, is integrated by the second integrator 39 and simultaneously passed through the third gain circuit 35, which forms a quickening path. The results of the integration and quickening path are summed in the second two-input summer 47. The resultant signal is modified by the inner loop augmentation circuit 49 in accordance with the magnitude of the other feedback signals and the result used to control the position of the movable surface 17 via the actuator 15. The movable surface 17 is positioned so as to drive the error signal to zero. When this occurs, the flight path angle sensed by the flight path angle sensor 53 is driven to match the flight path angle command produced by integrating the flight path rate command produced by the control device 11.

As will be readily appreciated by those familiar with control laws, the approach mode of operation of the electronic flight control system illustrated in FIG. 3 functions correctly when a flight path rate command is created by the pilot's movement of the control device 11. As noted above, the disadvantage of such a system occurs when it is necessary to flare the aircraft at the end of a landing approach. The embodiment of the invention illustrated in FIG. 3 avoids this disadvantage by eliminating, when flare begins, the first integrator 37, i.e., the integrator that converts the flight path rate command signal produced by movement of the control device 11 into a flight path angle command. The first integrator function is eliminated by the uncomplicated expedient of placing the first and second switches 51 and 53 in their flare positions and bypassing the first integrator. Preferably, the state of the first and second switches is automatically changed when the aircraft's radio altimeter senses that the aircraft has descended to a predetermined altitude, such as fifty (50) feet above the elevation of the runway. At the same altitude, the signal produced by the flight path angle sensor 53 is modified by subtractively summing it with the reference value, e.g., the $-3°$ value and, then, subtractively summing the result with the output of the first gain circuit 33. More specifically, when the aircraft reaches the altitude where flare is to start, the output of the reference circuit 41 changes to its flare, i.e., flight path angle reference, value. This results in the signal produced by the flight path angle sensor 53 being modified by the reference value. The resulting actual incremental flight path angle value is subtractively summed with the incremental flight path angle command and the result integrated by the second integrator 39 and passed through the third gain circuit 35. The results of these actions are negatively summed by the third summer 47. As a result, the aircraft tends to follow the pilot's commands regardless of airplane inertia or aerodynamic configuration, location in the flight envelope, and the presence of external disturbances, such as turbulence and wind shear. While the effect of these factors during flare is substantially decreased, if not entirely eliminated, because the signals produced by control device movement are processed during flare in substantially the same manner that they are processed during other flight states, e.g., approach, the elimination of the first integrator allows a pilot to "fly" the aircraft in a conventional manner during flare, i.e., pulling back the pitch-axis control device and holding the pull until the aircraft lands.

FIG. 3 also illustrates graphically the pilot vernier control input to the reference circuit 41 and the fact that the output of the reference circuit switches from zero to a flight path angle reference value when flare commences. The later item is graphically shown by a third two-position switch 55 having flare and non-flare positions. Vernier control may be implemented by a thumb-switch located on the pilot control device, or by some other mechanism.

FIG. 3A illustrates an alteration or variation of the embodiment of the invention illustrated in FIG. 3. Since these FIGURES are substantially the same only the differences will be described. Specifically, FIG. 3A illustrates the production of two useful pilot display control signals. The first pilot display control signal is simply the flight path angle reference value produced during flare. This signal is derived from the output of the reference circuit and applied to a suitable pilot display (not shown) via a fourth two-position switch 56 having flare and non-flare positions. The second pilot display signal is a flight path angle command signal derived by summing the incremental flight path angle command with the flight path angle reference value.

While the embodiments of the invention illustrated in FIGS. 3 and 3A eliminate the flare problem, discussed above, that occurs in an electronic flight control system that normally produces flight path angle commands by integrating control signals that are representative of the deflection of a pilot-operated pitch axis control device and, thus, is a substantial improvement over the prior art, it has certain disadvantages. The primary disadvantage is that the transition from an approach mode of operation to a flare mode of operation is relatively abrupt. The remaining embodiments of the invention (FIGS. 4–6A) avoid this problem by filtering the signal produced by the linear transducer 29 in a manner that provides a smooth transition between the approach and flare modes of operation.

Since the remaining embodiments of the invention are in many respects similar to the FIGS. 3 and 3A embodiments, only the differences between the embodiments of the invention illustrated in FIGS. 3 and 3A and the embodiments of the invention illustrated in FIGS. 4–6A are described. In this way unnecessary duplication of descriptive material is avoided.

Figure 4:
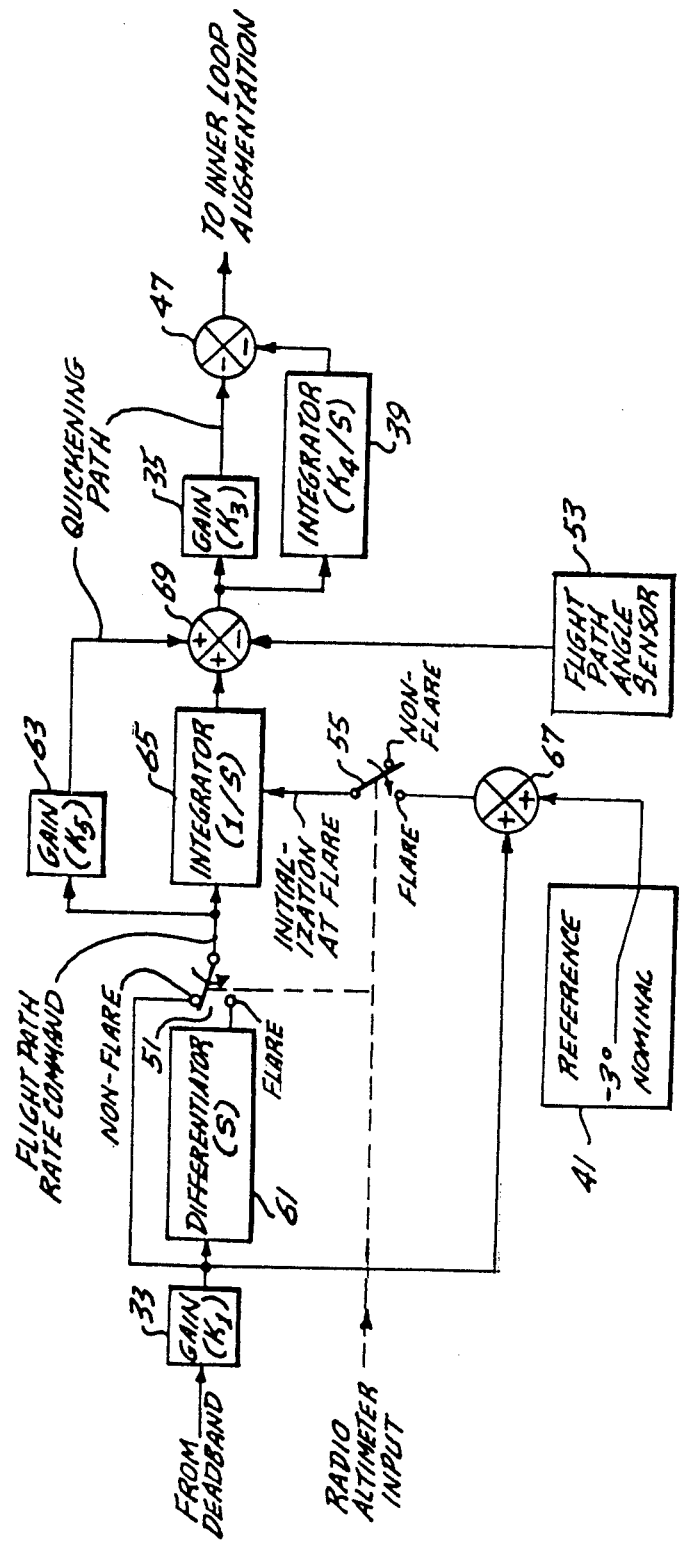
FIG. 4 is a functional block diagram of an alternative version of a flare control modification of a maneuver command electronic flight control system formed in accordance with this invention.

In the embodiment of the invention illustrated in FIG. 4, the output of the dead band circuit 32 is applied through the first gain circuit 33 to the input of a differentiator 61. The output of the first gain circuit 33 is applied to the non-flare terminal of the first two-position switch 51. The output of the differentiator 61 is applied to the flare terminal of the first two-position switch 51. The common terminal of the first two-position switch 51 is applied to the input of a fifth gain circuit 63 having a gain value designated $K_5$ and to the input of a third integrator 65. The third integrator 65 is denoted a simple integrator, i.e., an integrator with unity gain. Thus, the Laplace transform of the third integrator 65 is $1/s$. The output of the reference circuit 41 is applied to a positive input of a fourth summer 67. The output of the first gain circuit 33 is applied to a second positive input of the fourth summer 67. The output of the fourth summer 67 is applied to the flare terminal of the third two-position switch 55. The non-flare terminal of the third two-position switch is unconnected, i.e., zero. The common terminal of the third two-position switch 55 is connected to a control input of the third integrator 65. The control input sets the third integrator 65 to the reference circuit 41 nominal value, (e.g, $-3°$), initialized by the output of the first gain circuit in the manner described below, when the radio altimeter determines that the aircraft has reached flare altitude above runway elevation.

The output of the fifth gain circuit 63 and the third integrator 65 are each applied to positive inputs of a fifth summer 69. The output of the flight path angle sensor 53 is applied to a negative input of the fifth summer 69. The output of the fifth summer 69 is applied to the inputs of both the second gain circuit 35 and the second integrator 39. As with the embodiment of the invention illustrated in FIG. 3, the output of the second gain circuit 35 and the output of the second integrator 39 are applied to negative inputs of the third summer 47. The output of the third summer 47 is applied to an inner loop augmentation circuit, which is not illustrated in FIG. 4.

As will be readily appreciated by those familiar with control system terminology, in essence, the third integrator 65 is functionally equivalent to the first integrator 37 illustrated in FIG. 3 and described above. Thus, when the first two-position switch 51 is in the non-flare position, the third integrator 65 converts the flight path rate command signal produced by the movement of the control device 11 into a flight path angle command that is subtractively summed with the output of the flight path angle sensor 53 to produce an error signal. In this instance, the output of the reference circuit 41 has not effect on system operation because the third two-position switch 55 is in the non-flare position. Hence, when the first two-position switch 51 is in the non-flare position, the flight control system illustrated in FIG. 4 functions substantially identical to the way the flight control system illustrated in FIG. 3 functions when the first and second two-position switches 51 and 52 are in the non-flare position. More specifically, the flight path rate command signal is integrated to form a flight path angle command that is summed in a subtractive manner with the flight path angle sensor signal to produce an error signal that is used to control the position of a movable control surface 17, namely the elevator, of the aircraft.

The primary difference between the embodiments of the invention illustrated in FIGS. 3 and 3A and the embodiment of the invention illustrated in FIG. 4 is that rather than removing the integrator from the signal path (FIG. 3), a differentiator 61 is added to the signal path during the flare portion of a landing procedure. Mathematically, the differentiator offsets or negates the effect of the integrator 65. More specifically, as will be readily understood by those skilled in the control system art, when a differentiator and integrator are serially combined, the function of one cancels the function of the other. The transition between the approach mode of operation and the flare mode of operation is smoother in the embodiment of the invention illustrated in FIG. 4 than in the embodiments of the invention illustrated in FIGS. 3 and 3A due to the switch being upstream of the integrator.

At the instant of transition into the flare mode, the integrator 65 must be initialized to ensure that a given amount of pitch axis control device deflection produces a consistent and predictable flight path angle command value. If the integrator is not properly initialized, a large and, thus, abnormal pitch axis control device (e.g., stick) deflection may be required to achieve the flight path angle command required for a smooth touchdown. This is because the reference flight path command value (i.e., stick in detent position value) being held by the integrator in flare may be at an unusual level because of pilot maneuvering at the time that the flare mode becomes active.

One solution to this problem involves inhibiting the transition to the flare mode whenever the pitch axis control device is out of detent. Accordingly, whenever the aircraft descends below the radio altimeter value required for transition to flare and the stick is placed in detent, the transition would actually take place. The shortcoming of this implementation is that during high workload and/or unusual approaches, the pitch axis control device may never be placed in detent. For these cases, the landing would have to be conducted using the up-and-away control mode, which results in the problems previously discussed. An alternate means of solving this problem is provided by the invention.

In accordance with the invention, if the pitch axis control device 11 is in its detent position when the position of the first and third two-position switches 51 and 55 are changed to their flare mode active positions, the integrator 65 is initialized to the flight path angle defined by the output of the reference circuit 41, namely −3 degrees. This is because the value of the signal emanating from gain circuit 33 is zero. The result is that, for the duration of the flare mode, in the absence of any pilot vernier inputs which may change the reference, all stick deflections will result in incremental flight path angle command signals relative to the reference value −3 degrees. When the stick is returned to the detent position, a flight path angle command of −3 degrees will result.

If the pitch axis control device is not in its detent position when the flare mode becomes active, the integrator 65 is initialized to a value such that when the pitch axis control device is returned to its detent position, the flight path angle command will be at the level corresponding to the output of the reference circuit 41, namely −3 degrees. In this way, a constant deflection of the pitch axis control device 11 is always required in order to create a given flight path angle command. The signal emanating from gain circuit 33 and feeding into the fourth summer 69 provides the correction required to ensure proper initialization when the pitch axis control device 11 is out of detent when the flare mode becomes active. If the integrator 65 is initialized to the output of reference circuit 41 (without the correction term) when the control device is not in its detent position, then that "non-detent" position becomes the "neutral" position rather than the detent position being the neutral position about which the incremental flight path angle values (relative to −3 degrees) are commanded.

The integrator initialization is typically performed by linearly changing the value of the integrator to the required value over a short time period, one or two seconds, for example.

Figure 4A:
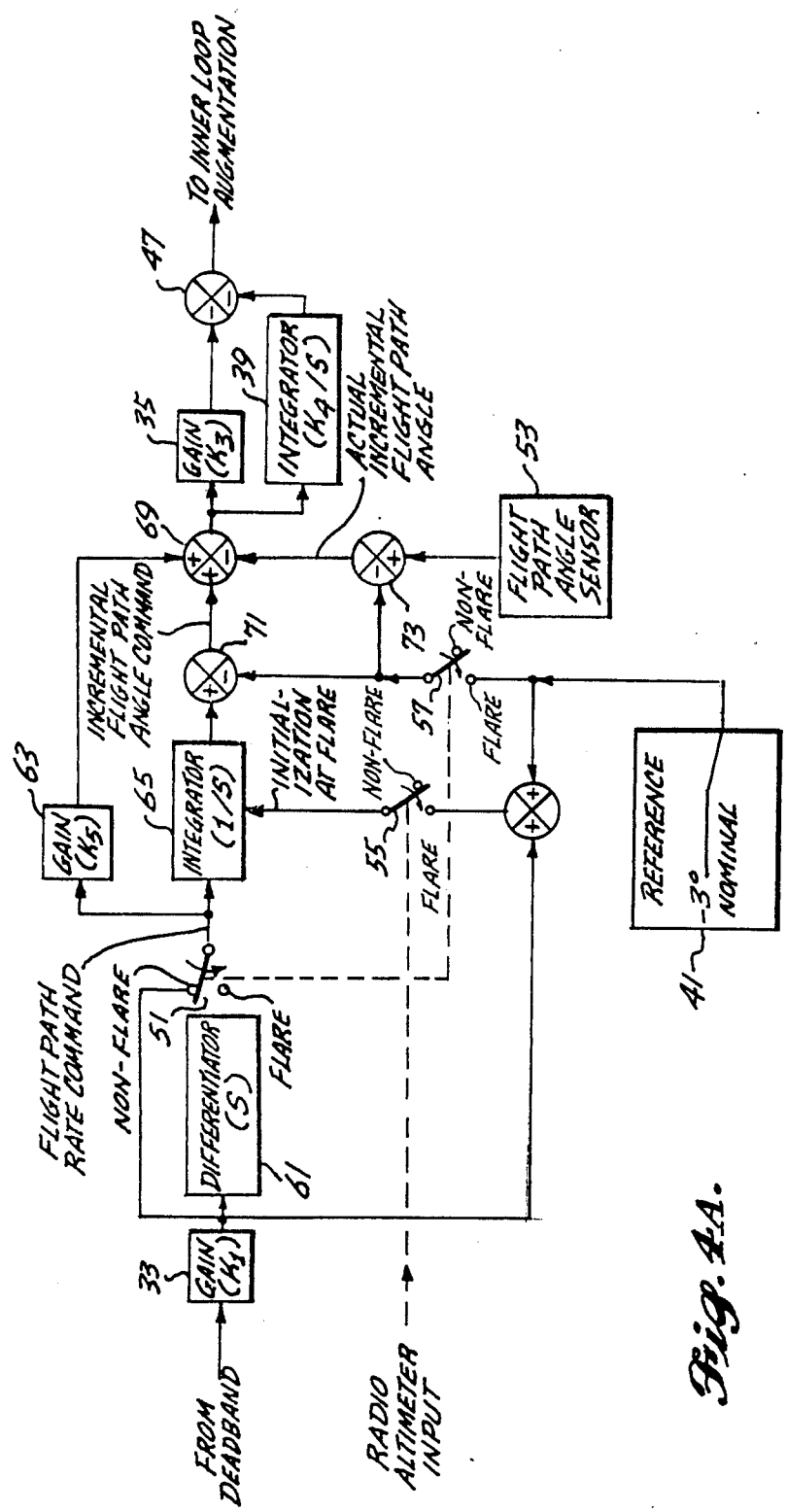
FIG. 4A is a functional block diagram of an alteration of the flare control modification illustrated in FIG. 4.

FIG. 4A illustrates an embodiment of the invention substantially identical to the embodiment of the invention illustrated in FIG. 4. The only difference between the embodiments of the invention illustrated in FIGS. 4 and 4A is the addition of sixth and seventh summers 71 and 73 and a fifth two-position switch 57. The sixth summer 71 is connected between the output of the third integrator 65 and the related input of the fifth summer 69 and the sixth summer 73 is connected between the output of the flight path angle sensor 53 and the associated input of the fifth summer 69. More specifically, the output of the third integrator 65 is connected to a positive input of the sixth summer 71. The output of the reference circuit is connected to a flare terminal of the fifth two-position switch 57. The non-flare terminal of the fifth two-position switch is unconnected and the common terminal of the fifth two-position switch is connected to a negative input of the sixth summer 71. The output of the flight path angle sensor 53 is connected to a positive input of the seventh summer 73 and the common terminal of the fifth two-position switch 57 is connected to a negative input of the seventh summer 73. As a result, the same reference value is subtracted from both the output of the third integrator 65 and the output of the flight path angle sensor 53 during flare.

The output of the sixth summer 71 is the incremental flight path angle command signal and the output of the seventh summer 73 is the actual incremental flight path angle signal. When the first, third and fifth two-position switches 51, 55 and 57 are in their flare positions and these signals are combined in the fifth summer 69, they create an error signal similar to that created by the previously described embodiments of the invention. While the operation of the FIG. 4A embodiment of the invention is identical to the operation of the FIG. 4 embodiment, the production of an incremental flight path angle command signal has the advantage of being usable to create an incremental flight path angle display for the pilot of an aircraft incorporating the invention. An incremental flight path angle display is advantageous because it depicts the amount of change commanded relative to a reference value.

Figure 5:
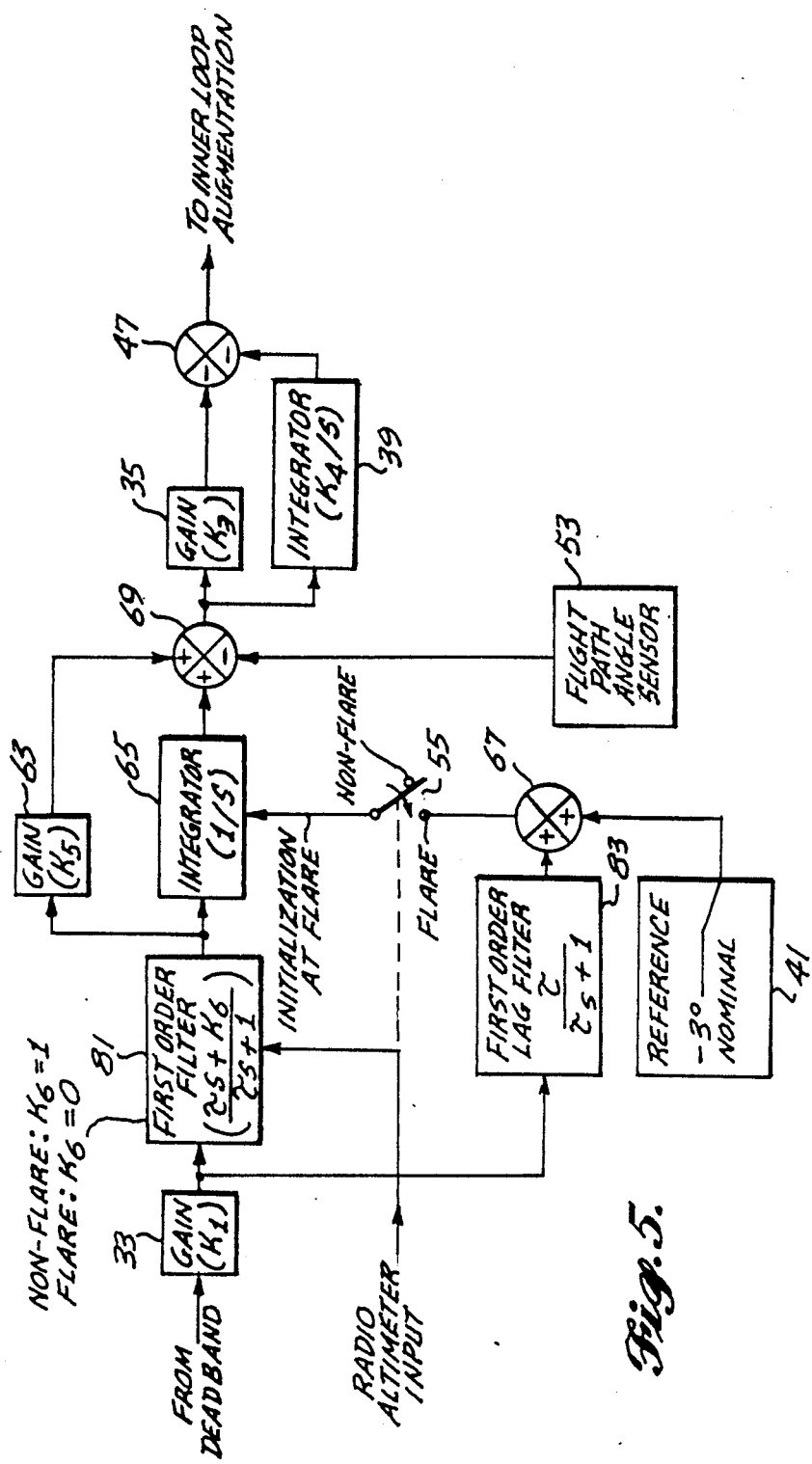
FIG. 5 is a functional block diagram of another alternative version of a flare control modification of a maneuver command electronic flight control system formed in accordance with this invention.

FIG. 5 illustrates an embodiment of the invention that is somewhat similar to the embodiment of the invention illustrated in FIG. 4. The only difference between the embodiment of the invention illustrated in FIG. 5 and the embodiment of the invention illustrated in FIG. 4 is replacing the differentiator 61 and the first two-position switch 51 with a first order filter 81 and adding a second first order lag filter 83 between the output of the first gain circuit 33 and the related input of the fourth summer 67. Specifically, the output of the first gain circuit 33 is connected to the input of the first order filter 81 and the output of the first order filter 81 is connected to the inputs of the fifth gain circuit 63 and the third integrator 65. The output of the first gain circuit 33 is connected to the input of the second first order lag filter 83 and the output of the second first order lag filter is connected to a positive input of the fourth summer 67.

The Laplace transform of first order filter 81 is:

$$\frac{\tau s + K_6}{\tau s + 1} \quad (1)$$

where the value of $K_6$ is dependent upon the position of the aircraft along the landing. During non-flare, $K_6$ equals one (1) and, during flare, $K_6$ equals zero (0). The value of $K_6$ is controlled by the same radio altimeter signal that controls the position of the third two-position switch 55, i.e., the two-position switch downstream of the reference input circuit 41. Since the value of $K_6$ equals one (1) during approach, the first order filter 81, in essence, has no effect on the signal produced by the output of the first gain circuit 33. This result occurs because the numerator and denominator of Equation (1) cancel when $K_6=1$. During flare, the numerator of the first order filter 81 equation is a differentiator term that cancels the effect of the third integrator 65 in the same way the differentiator 61 of the embodiment of the invention illustrated in FIGS. 4 and 4A cancelled the effect of the third integrator 65. At the start of flare, the denominator term of the first order filter 81 functions to create a smooth transition between the approach and the flare modes of operation of the electronic flight control system illustrated in FIG. 5. In essence, the FIG. 5 embodiment of the invention creates a differentiator by changing a type zero (0) filter to a type negative one (−1) filter.

The Laplace transform of the second first order lag filter is:

$$\frac{\tau}{\tau s + 1} \quad (2)$$

As with the embodiment of the invention illustrated in FIG. 4, the integrator initialization part of the network of the embodiment of the invention illustrated in FIG. 5 initializes the integrator 65 to a proper value to ensure consistent and predictable flight path angle command values during flare. The second first order lag filter 83 is provided to account for the effect of a pitch axis control device (e.g., stick) deflection (or residual stick deflection) that may exist at the instant that the transition to flare occurs. The dynamics of the second first order lag filter are identical to the command path consisting of the first order filter 81 followed by the integrator 65. The result is that the integrator 65 is initialized to a value such that when the stick is returned to detent, the flight path angle command returns to the output of the reference circuit 41, namely −3 degrees.

As in the embodiment shown in FIG. 4, the integrator initialization should be implemented by linearly changing the value of the integrator to the required value over a short time period, one or two seconds, for example.

Figure 5A:
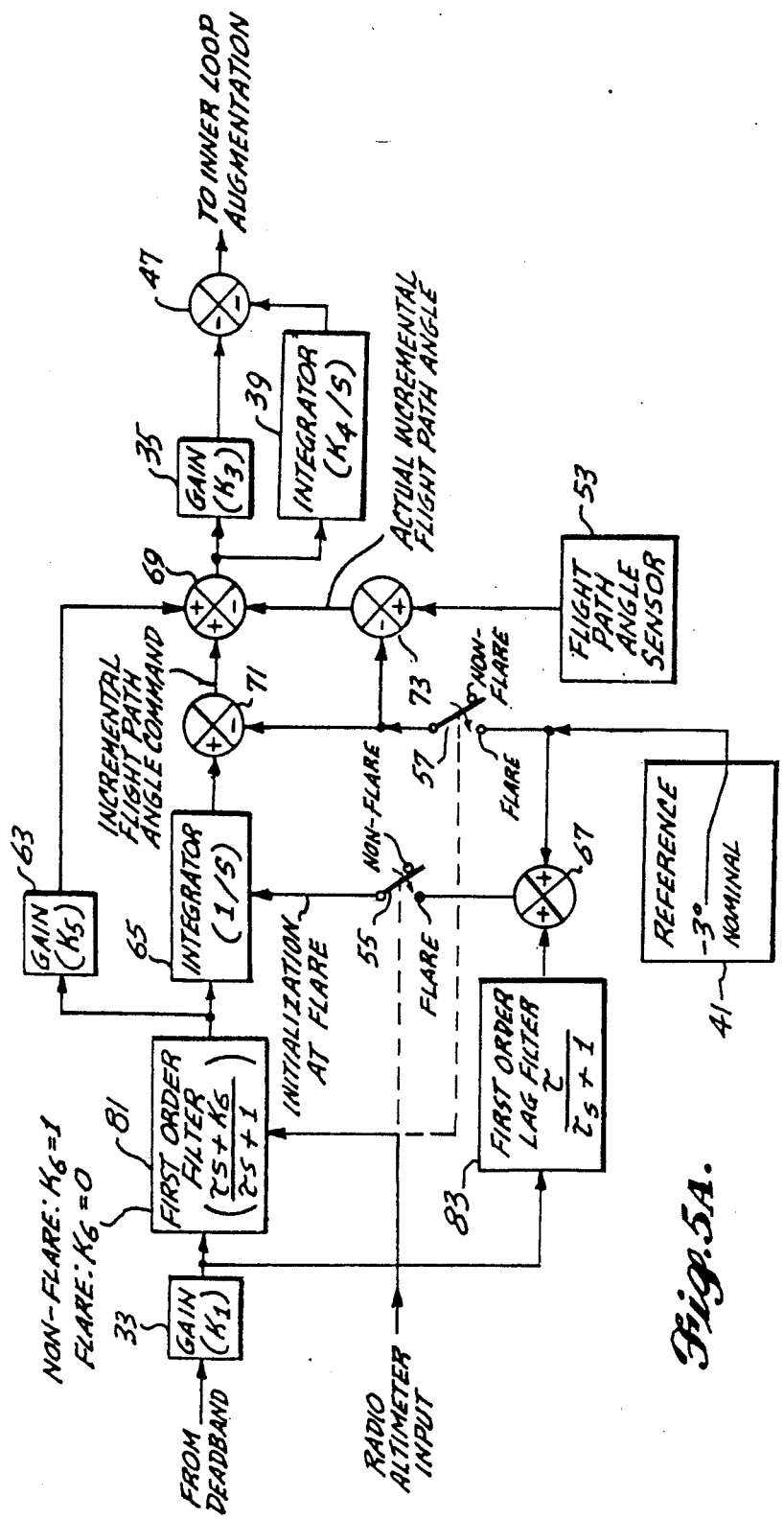
FIG. 5A is a functional block diagram of an alteration of the flare control modification illustrated in FIG. 5.

FIG. 5A illustrates an embodiment of the invention substantially identical to the embodiment of the invention illustrated in FIG. 5. The only difference between the embodiments of the invention illustrated in FIGS. 5 and 5A is the addition of the sixth and seventh summers 71 and 73 and the fifth two-input switch 57 connected in the manner described above with respect to FIG. 4A. More specifically, the sixth summer 71 is connected between the outputs of the third integrator 65 and the reference circuit 41 via the fifth two-input switch 57, and the related input of the fifth summer 69; and the seventh summer 73 is connected between the outputs of the flight path angle sensor 53 and the reference circuit 41 via the fifth two-input switch 57, and the associated input of the fifth summer 69. As a result, the same value is subtracted from both the output of the third integrator 65 and the output of the flight path angle sensor 53.

As with FIG. 4A, the output of the sixth summer 71 is the incremental flight path angle command signal and the output of the seventh summer 73 is the actual incremental flight path angle signal. When the first two-position switch 51 is in the flare position and these signals are combined in the fifth summer 69, they create an error signal similar to that created by the previously described embodiments of the invention. While the operation of the FIG. 5A embodiment of the invention is identical to the operation of the FIG. 5 embodiment, the production of an incremental flight path angle command signal has the advantage of being usable to create an incremental flight path angle display for the pilot of an aircraft incorporating the invention. An incremental flight path angle display is advantageous because it depicts the amount of change commanded relative to a reference value.

Figure 6:
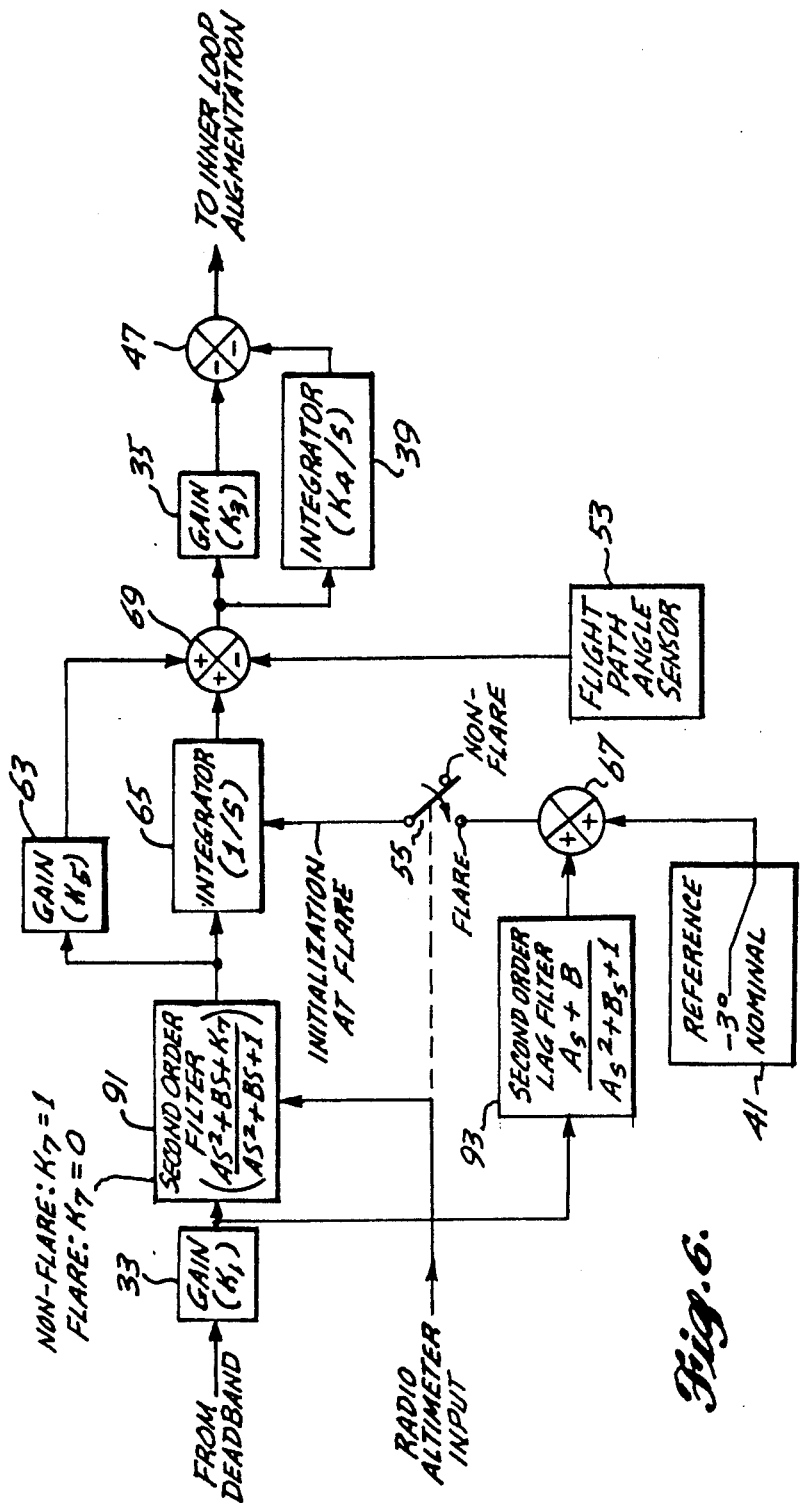
FIG. 6 is a functional block diagram of yet another alternative version of a flare control modification of a maneuver command electronic flight control system formed in accordance with this invention.

FIG. 6 illustrates an embodiment of the invention that is substantially identical to the embodiment of the invention illustrated in FIG. 5 except that the first order filter 81 of the embodiment of the invention illustrated in FIG. 5 is replaced with a second order filter 91 and the second first order lag filter 83 is replaced with a second second order lag filter 93. The Laplace transform of the second order filter 91 is:

$$\frac{As^2 + Bs + K_7}{As^2 + Bs + 1} \quad (3)$$

where the value of $K_7$ is determined by the position of the aircraft along the landing flight path. During non-flare $K_7$ equals one (1) and during flare $K_7$ equals zero (0). As a result, during approach, the second order filter 91 has substantially no effect on the output of the first gain circuit 33. This result occurs because the numerator and the denominator of Equation (2) cancel. During flare, the s term in the numerator of the second order filter 91 equation cancels the integration effect of the third integrator 65. More specifically, when $K_7$ equals zero (0), the numerator of the second order filter equation can be rearranged into the form $(As+B)s$. The s or differentiator term of this form cancels the integration effect of the third integrator 65 in the same way the differentiator of the embodiment of the invention as illustrated in FIG. 4 cancels the effect of the third integrator 65. Thus, like the FIGS. 5 and 5A embodiments of the invention, the FIG. 6 embodiment of the invention creates a differentiator by changing a type zero (0) filter to a type negative one ($-1$) filter. The major advantage of the embodiment of the invention illustrated in FIG. 6 is that it provides a smoother transition between the approach and flare modes of operation than the embodiment of the invention illustrated in FIG. 5.

The Laplace transform of the second second order lag filter 93 is:

$$\frac{As + B}{As^2 + Bs + 1} \quad (4)$$

The integrator initialization part of the network of the embodiment of the invention illustrated in FIG. 6 operates in a manner identical to that described in conjunction with the embodiment of the invention illustrated in FIG. 5. The second second order lag filter 93 is provided to account for the effect of a pitch axis control device (e.g., stick) deflection (or residual stick deflection) that may exist at the instant that the transition to flare occurs.

Figure 6A:
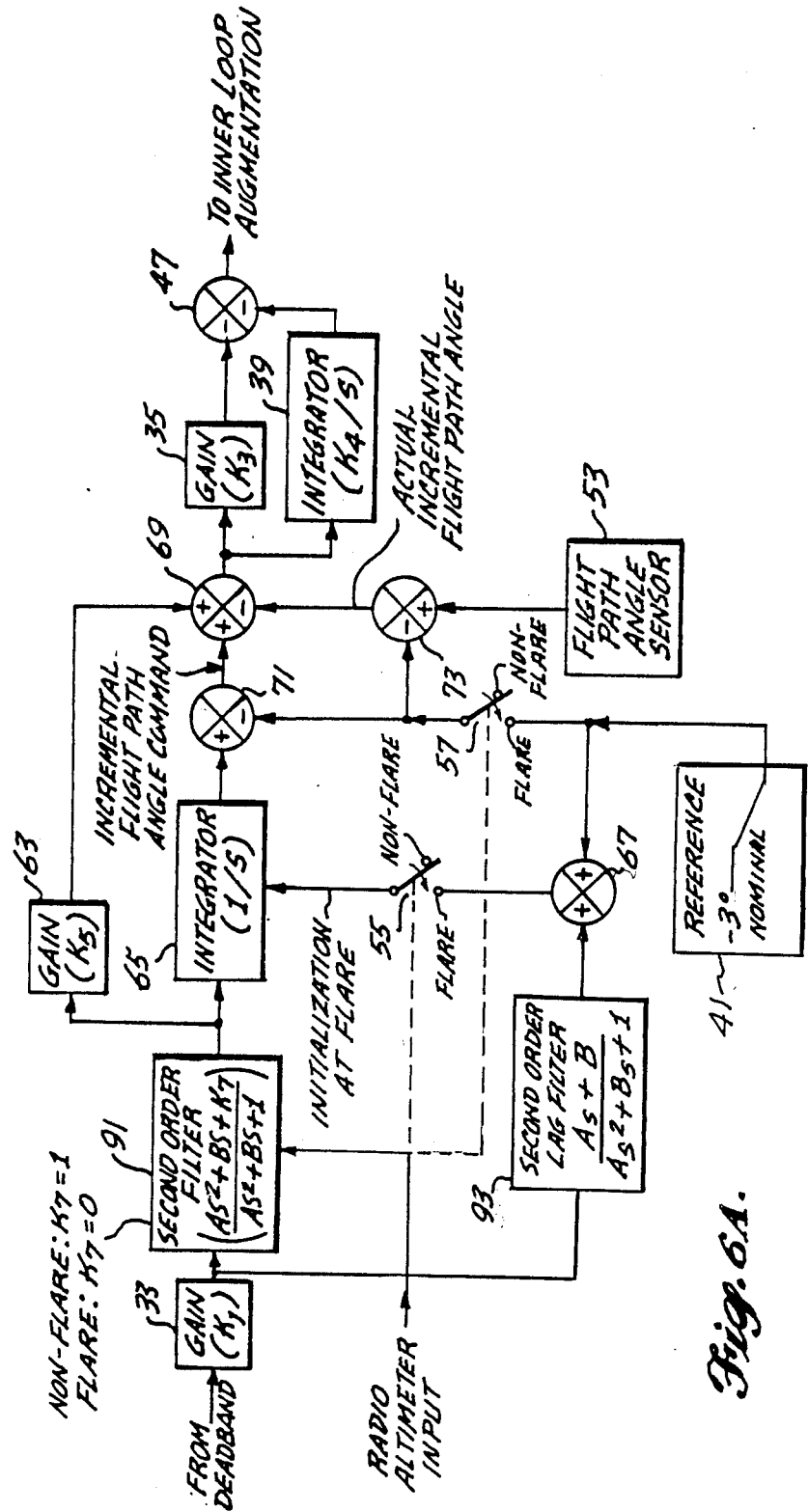
FIG. 6A is a functional block diagram of an alteration of the flare control modification illustrated in FIG. 6.

FIG. 6A illustrates an embodiment of the invention substantially identical to the embodiment of the invention illustrated in FIG. 6. The only difference between the embodiments of the invention illustrated in FIGS. 6 and 6A is the addition of the sixth and seventh summers 71 and 73 and the fifth two-input switch 57 connected in the manner described above with respect to FIGS. 4A and 5A. More specifically, the sixth summer 71 is connected between the outputs of the third integrator 65 and the reference circuit 41 via the fifth two-input switch 57 and the related input of the fifth summer 69; and the seventh summer 73 is connected between the outputs of the flight path angle sensor 53 and the reference circuit 41 via the fifth two-input switch 57, and the associated input of the fifth summer 69. As a result, the same value is subtracted from both the output of the third integrator 65 and the output of the flight path angle sensor 53 during flare.

As with FIGS. 4A and 5A, the output of the sixth summer 71 is the incremental flight path angle command signal and the output of the seventh summer 73 is the actual incremental flight path angle signal. When the first, third and fifth two-position switches 51, 55 and 57 are in their flare positions and these signals are combined in the fifth summer 69, they create an error signal similar to that created by the previously described embodiments of the invention. While the operation of the FIG. 6A embodiment of the invention is identical to the operation of the FIG. 6 embodiment, the production of an incremental flight path angle command signal has the advantage of being usable to create an incremental flight path angle display for the pilot of an aircraft incorporating the invention. An incremental flight path angle display is advantageous because it depicts the amount of change commanded relative to a reference value.

The FIG. 5, 5A, 6 and 6A embodiments of the invention are based on the proposition that the best flare control response is to match, as exactly as possible, the control response of the up-and-away mode of operation of a maneuver command electronic flight control system for the first several seconds after the system transitions to a flare control mode of operation. In this way, the finely tuned handling qualities of the up-and-away mode transfer as much as possible into the flare mode. In addition, the flare response will match the up-and-away response so that predictability of response will be available in all control modes. A pilot does not have to "learn" new control characteristics that are applicable only in the flare mode. Any and all experience that a pilot gains in the up-and-away mode directly carries over into flare mode. This result is achieved by inserting either a first order or a second order filter 81, 91 into the control path whose numerator and denominator expressions cancel each other out when the up-and-away mode is operational. The net transfer function is unity gain, and the flight path rate command (outside the dead band) is proportional to a signal representative of the position of the pilot-operated pitch axis control device 11.

At the start of a transition to flare mode, the last factor of the filter numerator ($K_6$ or $K_7$) is set equal to 0.0. This changes the filter to a "washout filter" in which high frequency signal components are passed, but low frequency (or steady state) components are attenuated. As a result, a step input produces an identical signal for the first instant of the flare mode response. Thereafter, the steady state component of the flare mode control signal produced by the pilot-operated pitch axis control device begins to "washout".

In handling qualities terminology, the airplane control sensitivity parameter, which is the airplane pitch acceleration that results from application of a unit force on the control device, is identical in both modes of operation. The flare mode sensitivity parameter, which is the steady state change in flight path angle per unit force on the control device, can be adjusted by varying the time constant of the washout filter. An additional benefit of this solution is that a smooth control response can be obtained in a go-around, in which a transition from the flare mode back to the up-and-away mode occurs. When K is changed from 0.0 back to 1.0, the past value in the filter is not reset, so that a smooth continuous transition from an incremental command mode to a rate command mode occurs. The time period of transition is based upon the filter time constant.

Figure 7A:
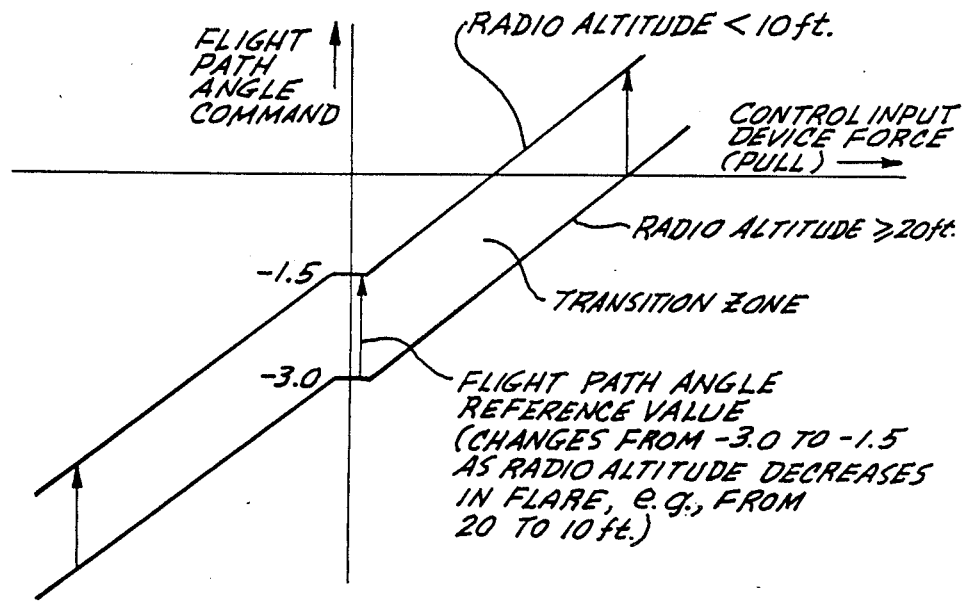
FIG. 7A is a plot of flight path angle command versus control input device force for a sink rate protection feature of the invention.
Figure 7B:
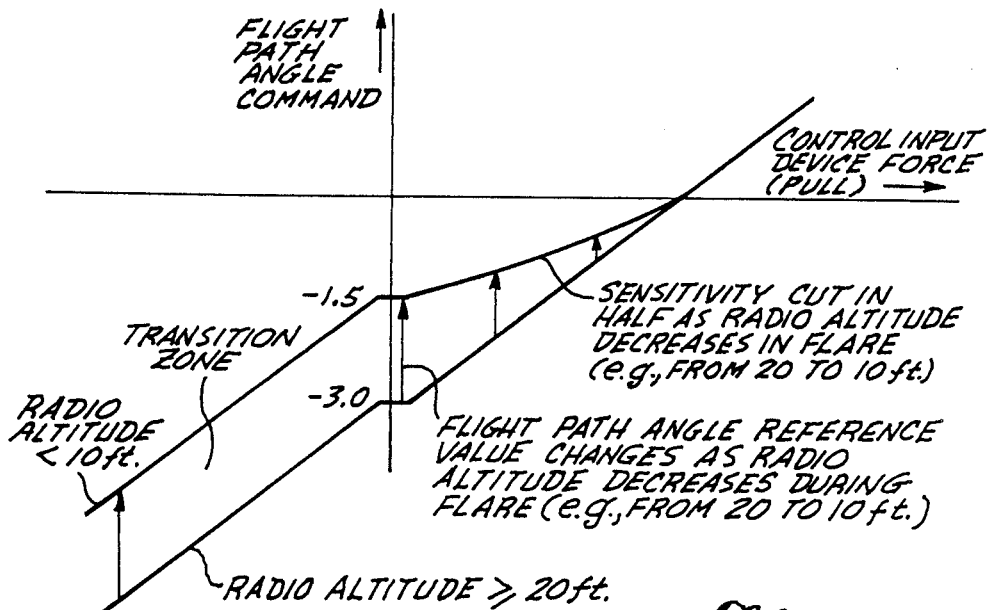
FIG. 7B is a plot of flight path angle command versus control input device force for a sink rate protection feature of the invention wherein a reduction in flight path angle command sensitivity to control input device force occurs in the flight path angle region associated with desirable touchdown sink rates.

All of the embodiments of the invention can be provided with sink rate protection by making the flight path angle reference value dependent upon aircraft altitude, as shown in FIGS. 7A and 7B. While the flight path angle reference value can be changed in a stepwise manner as the altitude of the aircraft decreases during flare, more preferably, the flight path angle reference value changes in a continuous manner, i.e., rather than being fixed at some value, such as $-3°$, the reference value changes during flare. Further, rather than starting at a fixed value, such as −3°, the reference value can be initialized in some other manner, such as being set to the flight path rate command generated by the control device prior to switching to the flare mode of operation. For a given pull force exerted by a pilot on a control input device, FIG. 7A graphically illustrates flight path angle command changes along with the reference value. Controlling the flight path angle reference value during flare provides sink rate protection by reducing the sink rate at landing for an unflared landing, i.e., a landing where a pilot does not pull the pitch axis control device to a flare position. FIG. 7B illustrates a further modification that reduces the sensitivity of sink rate to pitch axis control device force errors by reducing the change in flight angle command for a given change in control input device force (i.e., reducing $K_1$) in the region of desired sink rate (e.g., near flight angle command equal—0.5°). This modification can be better combined with the washout filter embodiment of the invention (FIGS. 5, 5A, 6 and 6A) to yield reduced changes in flight path angle command to changes in control device force while obtaining a comparable control sensitivity parameter by reducing the washout filter time constant (i.e., $\tau$) as the aircraft passes from an upper flare threshold altitude to a lower flare threshold altitude.

While the specific values of the various gain and filter terms will depend upon the specific application of an embodiment of the invention, representative values are set forth in the following table:

| Term | Value(s) |
| --- | --- |
| $K_1$ | $\frac{220}{V_T}$ ($V_T$ is in feet/second, limited to above 150.0) |
| $K_2$ | 1.0 |
| $K_{2A}$ | 1.6 |
| $K_3$ | 1.6 |
| $K_4$ | 1.0 |
| $K_5$ | 1.6 |
| $K_6$ | 0 during flare, 1.0 otherwise |
| $K_7$ | 0 during flare, 1.0 otherwise |
| A | 1.0 |
| B | 2.0 |
| $\tau$ | 1.0 |

As will be readily appreciated by those skilled in this art and others from the foregoing description, the invention provides a flare control modification for a maneuver command pitch axis electronic flight control system. The modification comprises producing a reference related incremental flight path angle command from the pilot-operated pitch axis control device. Although various preferred embodiments of the invention have been illustrated and described, it is to be understood that the invention is not limited to these embodiments. Thus, it is to be understood that within the scope of the appended claims, various changes can be made in the specifically disclosed embodiments of the invention. For example, depending upon signal level and other relevant factors, one or more of the various gain circuits can be eliminated. Moreover, it may be desirable in some embodiments of the invention to differentiate the signal produced by the pilot-operated pitch axis control device after it is integrated rather than before, and to use smoothing means such as easy-ons and easy-offs for the various switches.

The embodiments of the invention in which an exclusive property or privilege is claimed are defined as follows:

1. In an aircraft maneuver command electronic flight control system wherein a continuing pitch axis control signal is produced by a continuing steady input applied to a pilot-operated pitch axis control device, the improvement comprising:
   altimeter means for determining the height of the aircraft above the ground and producing a related altimeter signal; and
   command modification means responsively connected to said pilot-operated pitch axis control device and to said altimeter means for receiving said pitch axis control signal and said altimeter signal and producing an incremental flight path angle command above a reference value based on the continuing steady input applied to said pilot-operated pitch axis control device, when the aircraft descends below a predetermined height above the ground during a landing maneuver.

2. The improvement claimed in claim 1, wherein:
   (a) said maneuver command electronic flight control system includes an integrator that integrates said pitch axis control signal;
   (b) said command modification means includes integration cancellation means for cancelling the effect of integrating said pitch axis control signal by bypassing said integrator.

3. The improvement claimed in claim 1, wherein:
   (a) said maneuver command electronic flight control system includes an integrator that integrates said pitch axis control signal; and
   (b) said command modification means includes integration cancellation means comprising a differentiator connected in series with said integrator.

4. The improvement claimed in claim 3, wherein, signalwise, said differentiator is upstream of said integrator.

5. The improvement claimed in claim 4, wherein said integrator is set to a predetermined value when said aircraft descends below said predetermined height above the ground during a landing maneuver.

6. The improvement claimed in claim 5, wherein said integrator is initialized by a value whose magnitude is dependent upon the position of said pitch axis control when said aircraft descends below said predetermined height above the ground during a landing maneuver.

7. The improvement claimed in claims 3, 4, 5, or 6, wherein said differentiator is formed by changing a type zero (0) filter to a type negative one (−1) filter when said aircraft descends below said predetermined altitude above the ground during a landing maneuver.

8. The improvement claimed in claim 7, wherein said filter is a first order filter.

9. The improvement claimed in claim 7, wherein said filter is a second order filter.

10. The improvement claimed in claim 7, wherein said type zero (0) filter has a simple unity gain.

11. The improvement claimed in claim 7, wherein said reference value is dependent upon the altitude of the aircraft after the aircraft descends below a predetermined height above the ground during a landing maneuver.

12. The improvement claimed in claim 11, wherein said reference value is dependent on the value of said pitch axis control signal immediately prior to said aircraft descending below said predetermined height above the ground during a landing maneuver.

13. The improvement claimed in claim 11, wherein the sensitivity of said command modification means to changes in said pitch axis control signal is dependent upon the altitude of the aircraft after the aircraft descends below a predetermined height above the ground during a landing maneuver.

14. The improvement claimed in claims 1, 2, 3, 4, 5, or 6, wherein said command modification means includes pilot-operated means for altering said reference value.

15. The improvement claimed in claims 1, 2, 3, 4, 5, or 6, wherein said reference value is dependent upon the altitude of the aircraft after the aircraft descends below a predetermined height above the ground during a landing maneuver.

16. The improvement claimed in claim 15, wherein said reference value is dependent on the value of said pitch axis control signal immediately prior to said aircraft descending below said predetermined height above the ground during a landing maneuver.

17. The improvement claimed in claim 15, wherein the sensitivity of said command modification means to changes in said pitch axis control signal is dependent upon the altitude of the aircraft after the aircraft descends below a predetermined height above the ground during a landing maneuver.

18. The improvement claimed in claims 1, 2, 3, 4, 5, or 6, wherein said command modification means stops producing said incremental flight path angle command above a reference value when said aircraft ascends above a second predetermined height after descending below said predetermined height.

19. The improvement claimed in claim 1, further comprising control means for driving the aircraft's actual incremental flight path angle above the reference to match said incremental flight path angle command.

20. A method of controlling, during the flare portion of a landing maneuver, the pitch axis movement of an aircraft controlled by an aircraft maneuver command electronic flight control system, said method comprising the steps of:
  determining the height of the aircraft above the ground during a landing maneuver; and
  controlling an incremental flight path angle command relative to a reference value in response to the deflection of a pilot-operated pitch axis control device when the aircraft descends below a predetermined altitude above the ground during a landing maneuver.

21. The method claimed in claim 20, wherein pitch axis movement of said aircraft during up-and-away flight is controlled by integrating pitch axis commands that are representative of the deflection of a pilot-operated pitch axis control device and wherein said step of controlling an incremental flight path angle command above a reference value is created by not integrating said pitch axis commands that are representative of the deflection of a pilot-operated pitch axis control device.

22. The method claimed in claim 20, wherein pitch axis movement of said aircraft during up-and-away flight is controlled by integrating pitch axis commands that are representative of the deflection of a pilot-operated control device and wherein said step of controlling an incremental flight path angle command above a reference value is created by differentiating said pitch axis commands that are representative of the deflection of a pilot-operated pitch axis control device.

23. The method claimed in claim 22, wherein said pitch axis commands that are representative of the deflection of a pilot-operated pitch axis control device are differentiated prior to said pitch axis commands being integrated.

24. The method claimed in claim 23, wherein said pitch axis commands that are representative of the deflection of a pilot-operated pitch axis control device are filtered as well as differentiated.

25. The method claimed in claim 24, wherein said pitch axis commands that are representative of the deflection of a pilot-operated control device are filtered by a first order filter.

26. The method claimed in claim 24, wherein said pitch axis commands that are representative of the deflection of a pilot-operated control device are filtered by a second order filter.

27. The method claimed in claims 20, 21, 22, 23, 24, 25 or 26, wherein said reference value is dependent on the altitude of said aircraft after the aircraft descends below a predetermined altitude above the ground during a landing maneuver.

28. The method claimed in claim 27, wherein the sensitivity of said response to the deflection of a pilot-operated pitch axis control device is dependent on the altitude of said aircraft after the aircraft descends below a predetermined altitude above the ground during a landing maneuver.

29. The method claimed in claims 20, 21, 22, 23, 24, 25 or 26, wherein said reference value is set to an initial value when said aircraft descends below a predetermined altitude above the ground during a landing maneuver.

30. The method claimed in claim 29, wherein said initial value is dependent on the state of said pilot-operated pitch axis control device just prior to said aircraft descending below a predetermined altitude above the ground during a landing maneuver.

* * * * *